United States Patent [19]

Pingry

[11] Patent Number: 4,480,735
[45] Date of Patent: Nov. 6, 1984

[54] CAM ACTUATED CONTROL FOR MATERIAL UNLOADER

[75] Inventor: Larry J. Pingry, Celina, Ohio

[73] Assignee: The Paul Revere Corporation, Coldwater, Ohio

[21] Appl. No.: 423,616

[22] Filed: Sep. 27, 1982

[51] Int. Cl.³ .................. A01C 15/12; G05G 9/12; F16D 47/02; F16D 23/12

[52] U.S. Cl. ........................ 192/48.3; 74/142; 74/471 R; 192/3.62; 192/48.8; 192/99 S; 239/677

[58] Field of Search ............... 192/48.7, 48.8, 48.3, 192/92, 99 S, 3.61, 3.62; 74/471 R, 142; 239/677, 672, 679

[56] References Cited

U.S. PATENT DOCUMENTS

| | | | |
|---|---|---|---|
| 1,463,445 | 7/1923 | Smith | 192/3.61 X |
| 1,499,418 | 7/1924 | Stevens | 192/99 S X |
| 1,693,645 | 12/1928 | Fahrney | 192/3.61 X |
| 2,342,837 | 2/1944 | Brown | 239/677 |
| 2,480,083 | 8/1949 | McMillan | 74/471 |
| 2,699,337 | 1/1955 | Best | 74/142 |
| 2,991,863 | 7/1961 | Glesmann et al. | 192/48.7 |
| 3,583,242 | 6/1971 | Thornbloom et al. | 239/677 X |
| 3,722,307 | 3/1973 | Campbell | 239/677 X |
| 4,196,859 | 4/1980 | Trott et al. | 239/677 |
| 4,241,879 | 12/1980 | Ostergren | 239/677 |

FOREIGN PATENT DOCUMENTS 368135  3/1932  United Kingdom ............... 192/3.62

Primary Examiner—Rodney H. Bonck
Attorney, Agent, or Firm—Robert J. McNair; Abraham Ogman

[57] ABSTRACT

A material unloader is presented having a cargo box structure with front and side walls. There is a beater mechanism rotatively mounted transversely at the rear of the cargo box and an endless apron conveyor disposed along the bottom for conveying material rearwardly to the beater. A main drive shaft powered from the PTO of the towing vehicle extends along one side of the cargo box where it interconnects with gear boxes for both the beater and the conveyor. The interconnection includes clutches and levers to actuate the clutches, together with drive coupling means. The positioning of the levers is simultaneously affected by a cam actuated control assembly mounted on the front wall of the cargo box. The control assembly comprises a rotatably mounted control shaft on which there is secured a multilobe cam plus a pawl and ratchet mechanism indexed by a pull rope for sequentially establishing a multiplicity of conveyor and beater unit drive conditions using a cam follower to relay commands via a control cable.

5 Claims, 8 Drawing Figures

BEATER

SLOW

FAST

CLEAN OUT

CAM ACTUATED CONTROL FOR MATERIAL UNLOADER

BACKGROUND OF THE INVENTION

This invention relates to agricultural implements and in particular has to do with the means for controlling the operation of the beater and feed conveyor mechanisms of a manure spreader.

Most manure spreaders are tractor drawn. A generation ago most of the mechanisms for unloading the spreaders were powered from the rear wheels. In recent machines, power to drive the unloading mechanisms is taken from the power-take-off of the tractor.

In U.S. Pat. No. 2,342,837 to Brown a control device for a manure spreader is described wherein dual levers on the front end of the machine are used. The pair of levers are simultaneously movable between operative and inoperative first and second positions. Additionally, there is a third position which keeps the beater turning at the same speed as in the second position of the control levers but causes the conveyor to speed up. In the Brown system, both the beater and the conveyor receive motive power from the rear wheels of the spreader.

In U.S. Pat. No. 3,583,242 to Thornbloom a drive and control system for a manure spreader is described. The spreader includes two gear boxes, one of which drives the beater mechanism, the other drives the conveyor. Power is supplied to the gear boxes via a drive shaft extending along the right side of the spreader box. A sprocket and drive chain arrangement at the front of the spreader allows driving power to be received from the PTO shaft of the tractor used for towing the spreader. The input shaft of the beater gear box is in axial alignment with the drive shaft, there being a selectively engageable first clutch therebetween for connecting the beater gear box to the power source. The input shaft of the conveyor gear box is offset from, but in parallel axial alignment with the drive shaft. Between the conveyor input and the drive shaft there are two different speed chain and sprocket drives. A double sided second clutch couples in the conveyor gear box to the drive shaft via one or the other of the chain and sprocket drives. A neutral position on the clutch is also selectable. A control shaft extending down the side of the spreader box in parallel with the main drive shaft operates two cam plates which position and selectively engage the two clutch mechanisms. A pawl and ratchet mechanism is connected to the control shaft for indexing the cam plates to a total of six positions which represent compatible modes of operation for the conveyor and beater units.

In U.S. Pat. No. 3,722,307 to Campbell a drive system for a manure spreader is described wherein motive power to operate both the beater and conveyor units is supplied from the power-take-off of the tractor. The drive system includes a driving shaft mounted on the left side of the spreader. At the rear corner of the spreader, the shaft is operatively connected to two gear boxes, one of which drives the beater mechanism, the other the conveyor. A control lever mounted on the front of the spreader box, positionable in any of four notches is linked by cable to operatively select the driving arrangement between the shaft and the two gear boxes.

U.S. Pat. No. 4,196,859 to Trott et al describes a fourth type of spreader control. In Trott et al there is a manure spreader which includes conveyor and beater assemblies which are powered from the PTO of the towing tractor. A single hydraulic control operates both the conveyor and beater drives. There is a drive shaft along the left hand side of the spreader box which is coupled to the beater gear box. A second shaft positioned parallel with the first furnishes power to the conveyor gear box. At the front of the spreader box there is a jaw clutch which provides for engaging and disengaging a gear on the end of the power shaft which is in line with the PTO. A jaw clutch and variable speed pulley assembly are also mounted on the end of the power shaft. The variable speed pulley provides a belt drive to a second pulley on the end of the conveyor drive shaft. The jaw clutch and the variable speed pulley assembly are simultaneously controlled by a cam operated shifter assembly. The cam is mounted on a control shaft along with a pawl and ratchet mechanism which are indexed by the hydraulic cylinder. Use of the variable speed pulley assembly allows the operator to vary the operating speed of the conveyor.

This invention eliminates many of the disadvantages of the prior art machines. A single control is easily operated by a pull rope which extends from the front of the cargo box to the towing tractor. This allows the operator to manipulate the controls without leaving the tractor seat. Additionally, the invention improves on the prior art in that the drive train between the PTO shaft to the beater and conveyor gear boxes is simplified.

SUMMARY OF THE INVENTION

The invention provides an improved means for controlling the conveyor and beater units of a material unloader. The control assembly includes an easily operated pull rope with which the driver of the tractor (or towing vehicle) can readily set the proper conveyor speed and beater unit operational combination.

A drive system is provided that includes a main drive shaft which extends down the side of the spreader box. The front end of the shaft is connected by chain and sprocket means to a short power-take-off (PTO) shaft positioned on the tongue of the spreader. This short shaft is coupled to and receives power from the PTO of the tractor. At the rear corner of the spreader box, the drive shaft is coupled to the beater and apron conveyor gear boxes by clutch and sprocket means. The clutch and sprocket sequencing arrangement makes it possible for the spreader operator to (1) begin by driving the beater mechanism while keeping the apron conveyor in neutral, (2) shift to operate the conveyor at a slow speed while continuing to drive the beater, (3) shift to drive the conveyor at a second and faster speed while the beater continues at the regular speed, and (4) shift to a cleanout configuration wherein the beater mechanism is declutched while the apron conveyor continues to move at the same fast speed as pertained in step (3).

The control which indexes the operational status of the beater and conveyor mechanisms includes a single cam operated shifter assembly which is mounted on the front of the spreader box. The shifter assembly consists of a cam plate fixed perpendicularly on a control shaft. A four position indexing mechanism provides for rotation of the cam. The cam radius at each of the four indexed positions is such as to affect the desired sequence of clutch and gear engagement combinations at the rear of the spreader. Control commands are conveyed to the rear of the spreader via a cable positioned by means of a cam rider arm. The cam indexing sequence is accomplished by successive pulls on the rope extending between the spreader and the tractor.

DESCRIPTION OF THE PREFERRED EMBODIMENT

Figure 1:
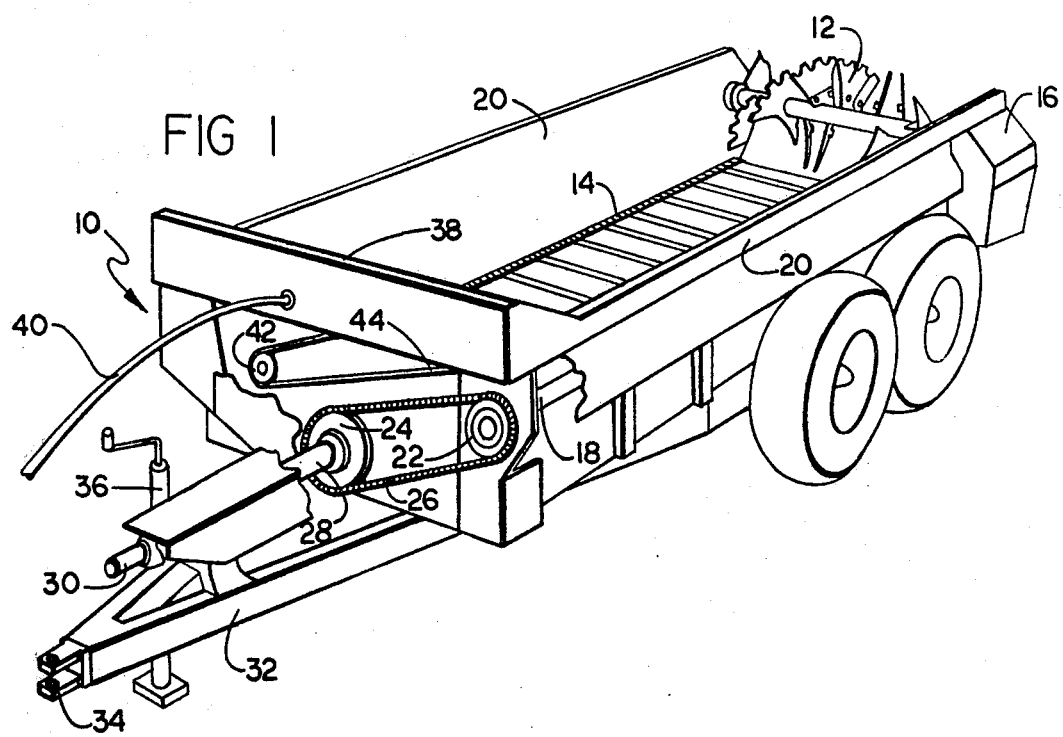
FIG. 1 is a perspective of the manure spreader in which the invention is embodied.

Referring to FIG. 1 there is shown a manure spreader or material unloader 10 having a cargo box 20, a transversely mounted beater 12 at the rear of the box and a conveyor 14 along the bottom. The beater and conveyor units are driven by gear mechanisms mounted at the left rear of the machine under protective cover 16. The main driving shaft 18 extends along the left side of the cargo box toward the front where it terminates at a sprocket 22. Both the conveyor and beater mechanisms are powered from main drive shaft 18.

Sprocket 22 is powered from drive sprocket 24 via chain 26. Power shaft 28 has sprocket 24 secured on one end while a spline coupling 30 on its front end provides connection to the tractor PTO (not shown). The tongue 32 of the spreader has a hitch 34 on its forwardmost end. A manually operated screw jack 36 keeps the front end of the spreader out of the dirt when unhooked from the tractor.

The front wall 38 of the cargo box has extending therefrom pull rope 40 which is shown extending toward a convenient tie point on the tractor. Pull rope 40 is used to step the cam actuated control 42 whose function will be described in detail. Control is accomplished by means of cable 44 whose first end is anchored to the front of the cargo box and its second end extends across and then the length of the cargo box 20 terminating at levers within protective cover 16.

Figure 2:
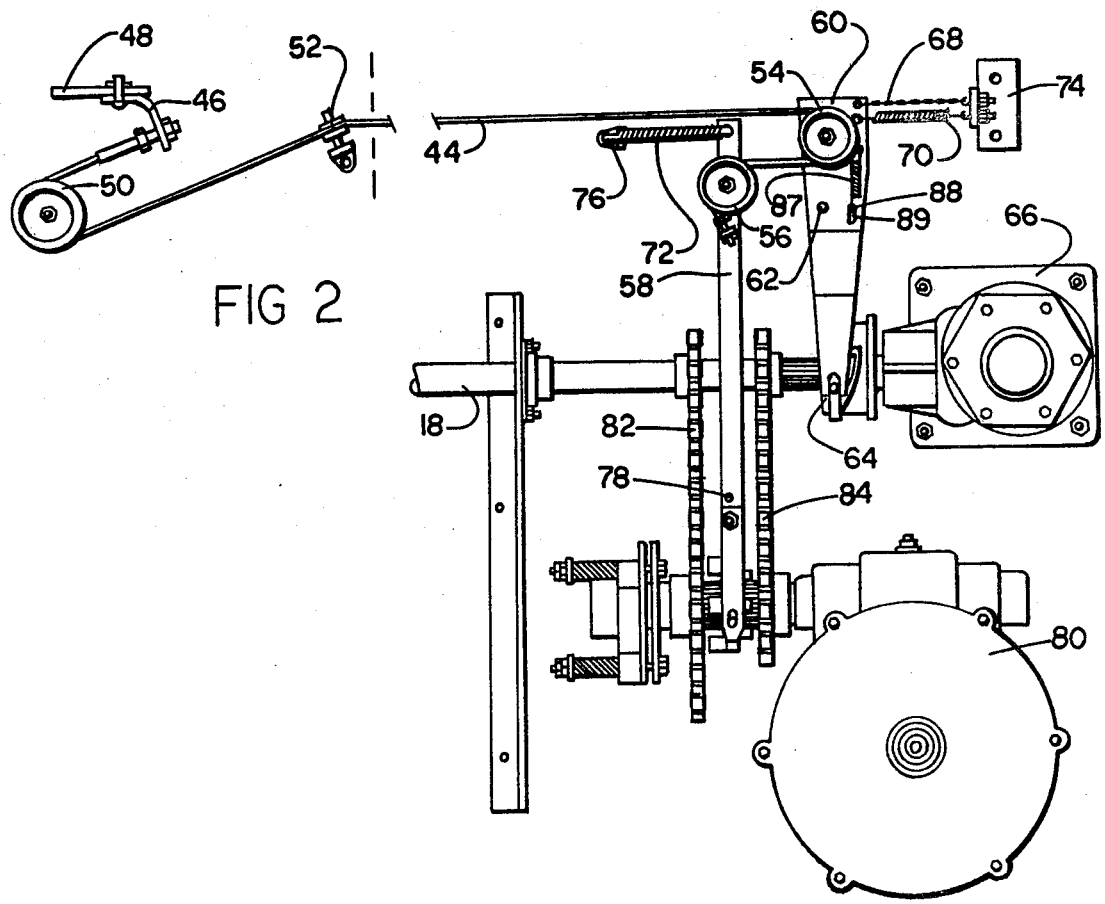
FIG. 2 is a partial side view of the left rear of the spreader including the control cable.

The manner in which control is achieved by means of a single cable is best described by reference to FIG. 2. As shown in FIG. 2 the first end of cable 44 is anchored to bracket 46 which is mounted on subframe 48. Subframe 48 is a part of the front wall 38 of the cargo box. From its first end cable 44 passes around pulley 50 which is a member of cam actuated control 42. Beyond pulley 50 the cable stretches across the front face of the spreader box to an idler pulley 52 at the left front corner of the cargo box. The cable then extends the length of the cargo box side 20. At the rear of the machine the cable passes around third pulley 54, forward over fourth pulley 56 to an anchor point on lever 58.

Third pulley 54 is supported on first shifting lever 60. Shifting lever 60 pivots on pin 62. The lower end of lever 60 engages slip clutch 64. Slip clutch 64 is between the end of main drive shaft 18 and the beater gear box 66. The topmost end of lever 60 is restrained by stop 68. The positioning of first lever 60 and second lever 58 is controlled by means of first spring 70 and second spring 72. The second ends of springs 70 and 72 are anchored to the sidewall of the spreader by means of brackets 74 and 76 respectively.

The force necessary to extend spring 70 is less than the force required to extend spring 72. As a result a pull exerted on cable 44 will first stretch spring 70 until stop 68 reaches its limit. After stop 68 reaches its limit a further pull on cable 44 would then cause spring 72 to become extended.

Lever 58 pivots around pin 78. In the neutral position depicted in FIG. 2 the position of lever 58 is such that conveyor gear case 80 will not be driven by rotation of main drive shaft 18. There is a double sided clutch mechanism at the lower end of lever 58. Thus when the lower end of lever 58 is moved leftward, sprocket chain assembly 82 will be engaged causing the conveyor gear box 80 to rotate at a relatively slow speed. When the lower end of lever 58 is moved to the right, sprocket chain assembly 84 will be engaged causing the conveyor gear box 80 to be driven at a relatively fast speed.

As depicted in FIG. 2, main drive shaft 18 will drive only the beater mechanism. However, if cable 44 is pulled, lever 60 will remain in the position shown since stop 68 is already at its limit, this causing motion of lever 58 to occur in a clockwise direction around pin 78. This engages the conveyor gear box so that the drive is at a relatively slow speed. If the pull on cable 44 is relaxed somewhat from the status shown in FIG. 2, lever 58 goes counterclockwise around pin 78 causing the double sided clutch to engage sprocket drive 84. This condition will cause main drive shaft 18 to power beater gear box 66 while conveyor gear box 80 is driven at a relatively fast speed. A further relaxation of the pull on cable 44 will cause spring 72 to maintain the conveyor in its fast speed position while at the same time spring 70 pulls lever 60 in a clockwise direction around pin 62. This disengages the beater from the drive train causing a condition known as cleanout.

Slip clutch 64 is of the overriding type. This means that if the beater is running and the main drive shaft 18 stops (operator shifts PTO to neutral) the inertia of the beater will not have to be dissipated quickly at the clutch. Rather, lever 60 is hinged in the middle with tension spring 87 holding pin 88 against a stop which normally keeps the lever aligned in the FIG. 2 configuration. It will be understood that pin 88 is mounted in that portion of the lever which is below pivot point 62. When inertial forces of the beater cause gear box 66 to override clutch 64, lateral forces on lever 60 cause pin 88 to slide along slot 89 as clutch 64 rotates clockwise with respect to main drive shaft 18. Use of hinged lever 60 thus allows cable 44 to remain in its FIG. 2 status while providing override safety at the beater clutch.

Figure 3:
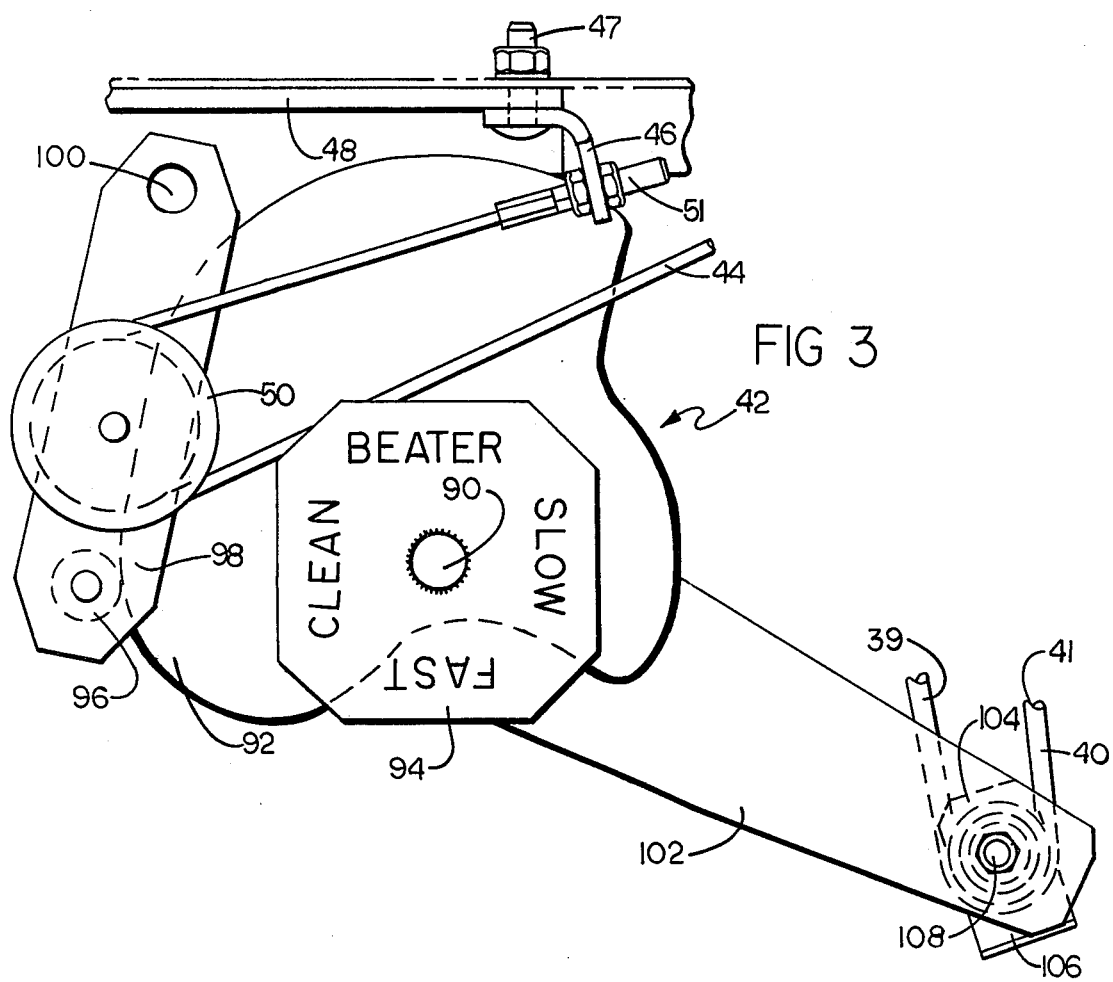
FIG. 3 is a front view of the cam shifter assembly showing the cam and the cam rider.

In FIG. 3 there is shown a front view of cam actuated control 42. Control 42 includes a control shaft 90 which extends from the front wall of the spreader in a direction parallel to the center line of the machine. Control shaft 90 has mounted thereon cam 92. Forward of cam 92 is an indicia 94 which tells the operator the status of the control system. In the position shown in FIG. 3 the indicia signifies that the cam is in the "BEATER" position. Cam 92 is 4-lobed. A cam follower roller 96 is held against the face of cam 92 by tension in cable 44. The cam roller 96 is mounted on one end of arm 98. The second end of arm 98 is pivotally mounted to the subframe by bolt 100. Near the middle of arm 98 and secured to the front face thereof is pulley 50. Control cable 44 encircles pulley 50. One end of cable 44 terminates at threaded connector 51. Connector 51 is secured to subframe 48 by means of bracket 46 using bolt 47 or equivalent.

Cam 92 is stepped to each of its four positions by means of stepping arm 102. Pull rope 40 actuates arm 102. End 39 of pull rope 40 is tied off at an appropriate part of the front of the machine. End 41 passes over a pulley (not shown) so that it exits from the front face of the spreader, much as is shown in FIG. 1. As shown in FIG. 3 pull rope 40 loops around a small pulley 104 that is held in place by a U-shaped keeper 106 and a bolt 108.

Figure 4:
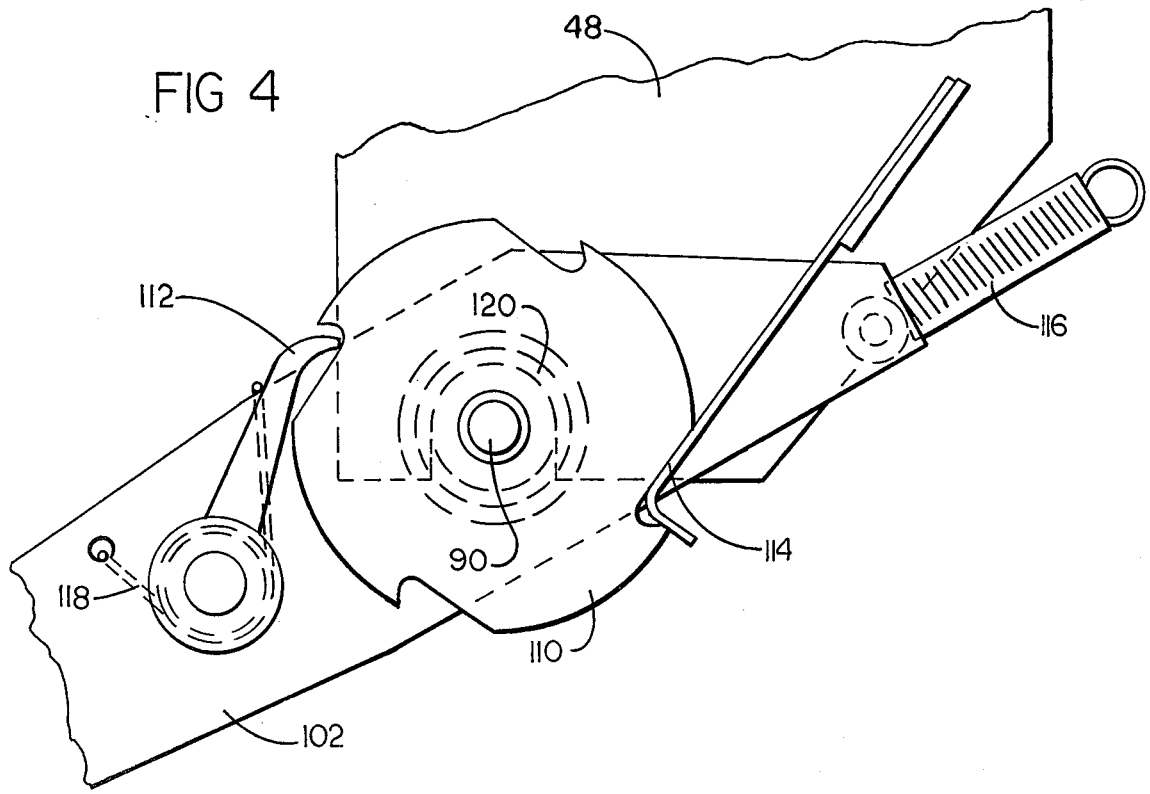
FIG. 4 is a rear view of the FIG. 3 cam shifter assembly showing the indexing mechanism.

The rear of the control assembly is shown in FIG. 4. There it will be seen that control shaft 90 has mounted thereon a ratchet 110. A clockwise rotation of arm 102 causes pawl 112 to advance ratchet 110 by 90 degrees. Indexing of pawl 110 is accomplished by means of leaf spring 114. At the right hand end of arm 102 is tension spring 116 which returns arm 102 allowing pawl 112 to snap into the next available step. Two turn coil spring 118 keeps pawl 112 against the ratchet 110. Control shaft 90 has mounted thereon a short sleeve section 120 which keeps the entire control assembly in position with respect to subframe 48. Sleeve 120 can be attached to subframe 48 by welding or other appropriate means to allow shaft 90 to rotate therein.

Figure 2A:
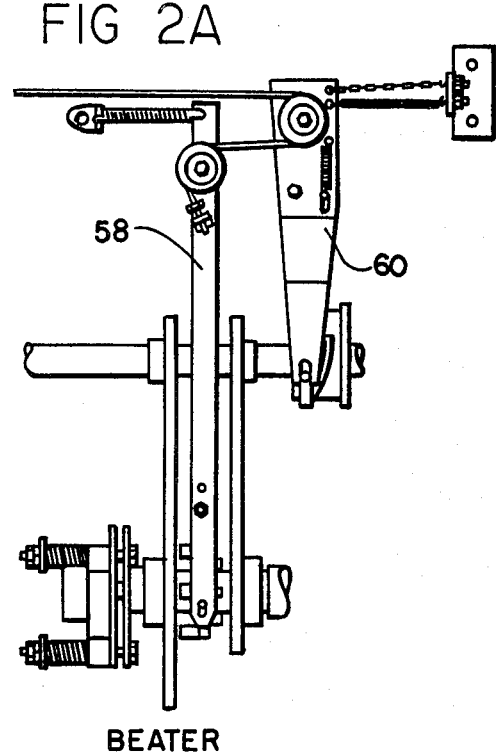
FIG. 2A shows the orientation of the FIG. 2 control levers for the detent position of the cam shifter assembly in the BEATER operate condition.
Figure 2B:
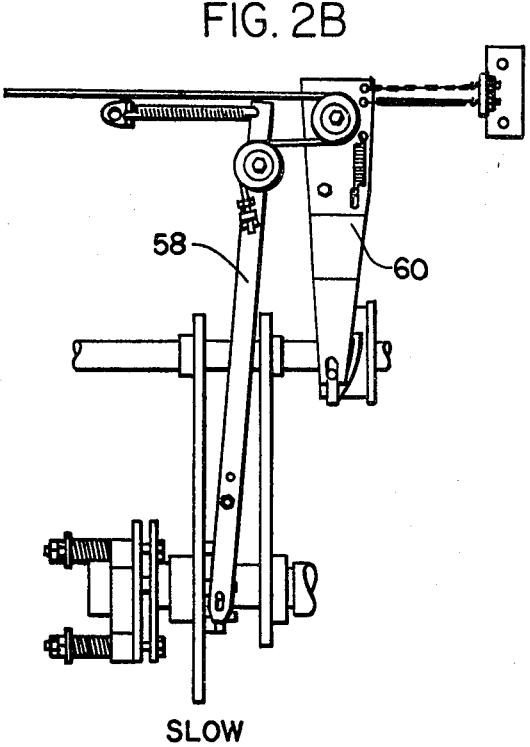
FIG. 2B shows the orientation of the FIG. 2 control levers for the detent position of the cam shifter assembly in the BEATER plus SLOW speed conveyor condition.
Figure 2C:
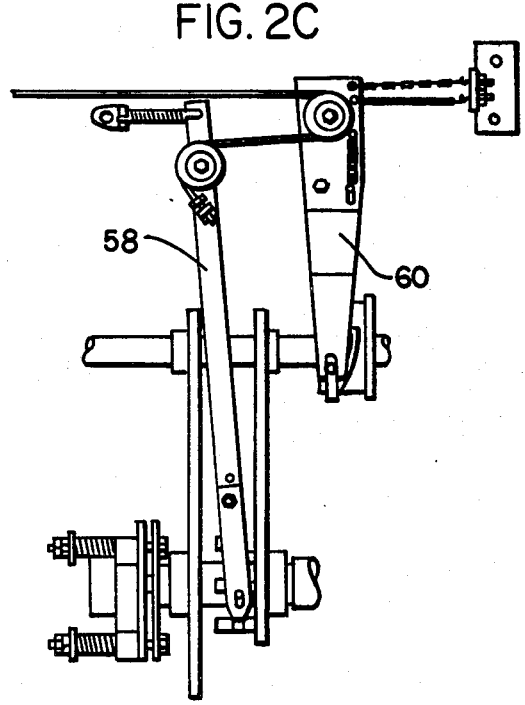
FIG. 2C shows the orientation of the FIG. 2 control levers for the detent position of the cam shifter assembly in the BEATER plus FAST speed conveyor condition.
Figure 2D:
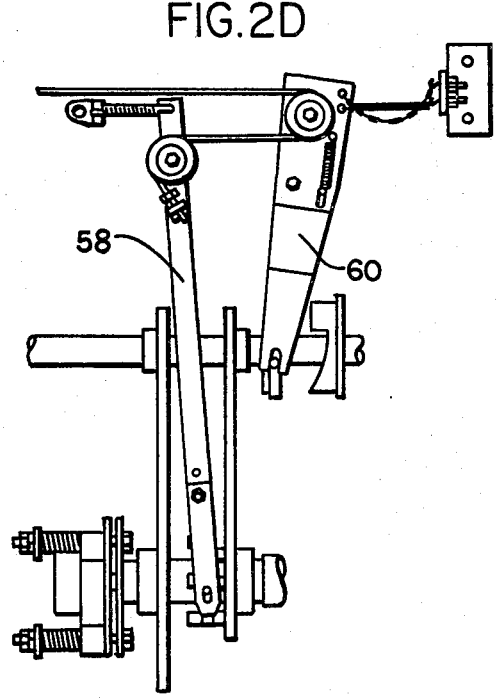
FIG. 2D shows the orientation of the FIG. 2 control levers for the detent position of the cam shifter assembly in the CLEANOUT condition where the conveyor moves fast but the beater is declutched.

Functionally then, successive pulls on rope 40 will advance the cam 92 counterclockwise in 90 degree steps. Each of these steps has a different preselected cam lobe radius which is presented to the cam follower 96. For the cam configuration shown in FIG. 3 the radius ratio and indicia combinations are approximately as follows: "BEATER"—2.0; "SLOW"—2.5; "FAST"—1.5; "CLEAN"—0.5. These differing radii ratios will cause pulley 50 to establish the desired operating criteria in levers 58 and 60 of the FIG. 2 mechanism (See FIG. 2A for the four possible lever orientations). It should be noted that the indicia of FIG. 3 is behind an opening in the front panel of the spreader. Therefore, only a single word appears at a given time making it easy for the operator to determine the operating status of the machine. Proper setup of the control system is readily obtained by adjustment of the nuts on the terminating ends of the control cable 44. Shielding of cable 44 is maintained throughout its length by protective covers.

With my invention a single 4-lobed cam establishes control conditions of both a two speed conveyor and the spreader beater mechanism. Control is accomplished using in combination, the cam, a cam follower, a single cable, two levers, pulleys mounted on the levers and springs of different rates for proper phasing of the lever motion. Total parts are reduced with respect to the prior art. Assembly of the parts is simplified and frictional loss is minimized. Adjustment of the cable has been positioned adjacent to the clutch engagement mechanism. The rope pull forces required of the operator have been reduced over the prior art.

The invention, of course, can be implemented in other specific ways without departing from the spirit and essential characteristics of the invention. The described embodiment is to be considered as only illustrative and not restrictive. For example, changes may be made in the number of lobes on the cam without changing the meaning of the invention. Implementation with a 2-lobed cam would provide a material unloader wherein the beater could be started while the conveyor was held immobile followed by a second condition wherein both the beater and the conveyor operated at a single predetermined speed.

I claim:

1. Means for controlling a pair of clutches comprising:
    first clutch means having a first lever rotatable about a pivot for actuating said first clutch means, said first clutch means also having a stop limiting the counterclockwise rotation of the first lever;
    second clutch means having a second lever rotatable about a second pivot for actuating said second clutch means;
    first spring means for biasing said first lever in a clockwise position;
    second spring means for biasing said second lever in a counterclockwise position, the force required to extend the first spring means being less than the force required to extend the second spring means;
    cable means connecting both the first and second levers and for preferentially rotating the first lever counterclockwise thus extending the first spring and then rotating the second lever clockwise extending the second spring after the first lever comes to rest on its counterclockwise stop; and
    sequencing means for pulling and relaxing said cable in predetermined steps whereby one or more of said levers is moved in predetermined sequences.

2. Means for controlling a pair of clutches as defined in claim 1 wherein the sequencing means includes a cam containing a plurality of cam lobes having preselected cam radii and cam follower means for converting the cam radii into preselected rectilinear movements of the cable.

3. The invention as defined in claim 2 wherein the cam has four lobes.

4. Means for controlling a pair of clutches as defined in claim 1 wherein the first lever contains a pulley and said cable means is entrained around the pulley and connected to the second lever.

5. Means for controlling a pair of clutches as defined in claim 1 wherein the first lever is rotatable between an on and an off position and said second lever is rotatable through a plurality of predetermined positions.

* * * * *